(12) United States Patent
Suzuki et al.

(10) Patent No.: US 11,845,364 B2
(45) Date of Patent: Dec. 19, 2023

(54) VEHICLE SEAT ASSEMBLY AND METHOD OF INSTALLATION

(71) Applicant: Honda Motor Co., Ltd., Tokyo (JP)

(72) Inventors: Junichi Suzuki, Royal Oak, MI (US); Fernando M. Rosero, Rochester Hills, MI (US); Eric D. Daume, Plain City, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 17/538,149

(22) Filed: Nov. 30, 2021

(65) Prior Publication Data

US 2023/0166640 A1 Jun. 1, 2023

(51) Int. Cl.
  *B60N 2/68* (2006.01)
  *B60N 2/75* (2018.01)
  *B60N 2/02* (2006.01)
  *B60N 2/90* (2018.01)
  *B60N 2/62* (2006.01)

(52) U.S. Cl.
  CPC ............ *B60N 2/0292* (2013.01); *B60N 2/62* (2013.01); *B60N 2/682* (2013.01); *B60N 2/686* (2013.01); *B60N 2/986* (2018.02)

(58) Field of Classification Search
  CPC .......... B60N 2/682; B60N 2/686; B60N 2/78; B60N 2/75
  See application file for complete search history.

(56) References Cited

U.S. PATENT DOCUMENTS

| | | | | |
|---|---|---|---|---|
| 1,746,986 A | | 2/1930 | Bell | |
| 1,857,418 A | | 5/1932 | Wedler | |
| 1,960,135 A | * | 5/1934 | Blum | B60N 2/75 296/153 |
| 1,996,575 A | | 4/1935 | Fry et al. | |
| 2,137,726 A | * | 11/1938 | Miller | B60N 2/682 5/409 |
| 2,305,871 A | * | 12/1942 | Hathaway | B60N 2/75 297/411.21 |
| 6,412,866 B2 | | 7/2002 | Koyanagi et al. | |

(Continued)

FOREIGN PATENT DOCUMENTS

| | | |
|---|---|---|
| DE | 102007032448 | 1/2009 |
| EP | 0980789 | 2/2000 |

(Continued)

*Primary Examiner* — Timothy J Brindley
(74) *Attorney, Agent, or Firm* — Mark E. Duell; RANKIN, HILL & CLARK LLP

(57) ABSTRACT

A vehicle seat assembly includes a seat main frame including a seat back attached to the seat main frame. The vehicle seat assembly also includes left and right side members in which each side member defines an outboard seat back bolster and an armrest. The armrest has a forward attachment bracket for attachment to the seat main frame. The vehicle seat assembly also includes a seat base including a seat base frame attached to the seat main frame and left and right corner cover members separate from the respective left and right side members and the seat base. Each corner cover member is adapted to cover the forward attachment bracket of the corresponding side member. Further, the left and right corner cover members conceal the attachment of the left and right side members to the seat main frame.

20 Claims, 3 Drawing Sheets

(56) References Cited

U.S. PATENT DOCUMENTS

| | | | |
|---|---|---|---|
| 7,347,499 B2 | 3/2008 | Slabaugh et al. | |
| 9,845,029 B1 | 12/2017 | Dry et al. | |
| 10,538,180 B2* | 1/2020 | Nishimoto | B60N 2/5825 |
| 2017/0320415 A1* | 11/2017 | Mueller | B60N 2/686 |
| 2019/0160975 A1* | 5/2019 | VanNieulande | B60N 2/146 |
| 2020/0172040 A1* | 6/2020 | Cheng | B60R 21/207 |
| 2021/0107657 A1* | 4/2021 | Ozaki | B60N 2/686 |

FOREIGN PATENT DOCUMENTS

| | | |
|---|---|---|
| GB | 2403139 | 12/2004 |
| JP | 5741950 | 7/2015 |
| JP | 6059069 | 1/2017 |
| JP | 2018199381 | 12/2018 |

\* cited by examiner

VEHICLE SEAT ASSEMBLY AND METHOD OF INSTALLATION

BACKGROUND

The present disclosure relates to a vehicle seat assembly and a method of installing the vehicle seat assembly. Currently, a vehicle seat assembly is installed in a vehicle body by first mounting seat components (i.e., safety belt arrangements) to the vehicle body. With the components properly installed, trim or panel garnishes are fitted to surrounding portions of the vehicle body. A seat back is then mounted to the vehicle body via a seat main frame, and a bolster and a separate armrest are secured to the seat main frame. Finally, a seat base is mounted to the seat main frame via a seat base frame. However, this known installation method prevents the use of a continuous cushion pillow top over the bolter and armrest, thereby impacting the aesthetics of the installed vehicle seat assembly.

BRIEF DESCRIPTION

According to one aspect, a vehicle seat assembly includes a seat main frame including a seat back attached to the seat main frame. The vehicle seat assembly also includes left and right side members in which each side member defines an outboard seat back bolster and an armrest. The armrest has a forward attachment bracket for attachment to the seat main frame. The vehicle seat assembly also includes a seat base including a seat base frame attached to the seat main frame and left and right corner cover members separate from the respective left and right side members and the seat base. Each corner cover member is adapted to cover the forward attachment bracket of the corresponding side member. Further, the left and right corner cover members conceal the attachment of the left and right side members to the seat main frame.

According to another aspect, a method of assembling a seat within a vehicle body includes attaching a seat main frame to the vehicle body. The seat main frame includes a seat back wherein left and right sides of the seat back including respective left and right recessed portions. The method also includes attaching a left side member to a left side of the seat main frame. The left side member defines a left outboard bolster positioned in the left recessed portion and a left armrest. The method further includes attaching a right side member to a right side of the seat main frame. The right side member defines a right outboard bolster positioned in the right recessed portion and a right armrest. The method also includes attaching a seat base frame to the seat main frame and the seat base frame includes a seat base.

The method further includes attaching a cushion cover member to the seat main frame beneath the seat base for covering the attachment of the seat base frame and the seat main frame and attaching a left corner cover member to the left armrest and a left end portion of the cushion cover member. The method also includes attaching a right corner cover member to the right armrest and a right end portion of the cushion cover member.

According to another aspect, a vehicle seat assembly includes a seat main frame including a seat back attached to the seat main frame. Left and right sides of the seat back include respective left and right recessed portions. The vehicle seat assembly also includes a left side member defined by a left outboard bolster and a left armrest. The left armrest has a left forward attachment bracket for attachment to the seat main frame and the left outboard bolster is positioned in the left recessed portion. The vehicle seat assembly further includes a right side member defined by a right outboard bolster and a right armrest.

The right armrest has a right forward attachment bracket for attachment to the seat main frame and the right outboard bolster is positioned in the right recessed portion. The vehicle seat assembly also includes a seat base including a seat base frame attached to the seat main frame and a cushion cover member positioned beneath the seat base for covering the attachment of the seat base frame and the seat main frame. The vehicle seat assembly further includes a left corner cover member separate from the left side member and adapted to cover the attachment of the left forward attachment bracket to the seat main frame and a right corner cover member separate from the right side member and adapted to cover the attachment of the right forward attachment bracket to the seat main frame.

DETAILED DESCRIPTION

It should, of course, be understood that the description and drawings herein are merely illustrative and that various modifications and changes can be made in the structures disclosed without departing from the present disclosure. Spatially relative terms, such as "lower," "upper" and the like may be used to describe an element and/or feature's relationship to another element(s) and/or feature(s) as, for example, illustrated in the figures. Further, the term "substantially" is defined to be essentially conforming to the particular dimension, shape or other word that substantially modifies, such that the component need not be exact.

Figure 1:
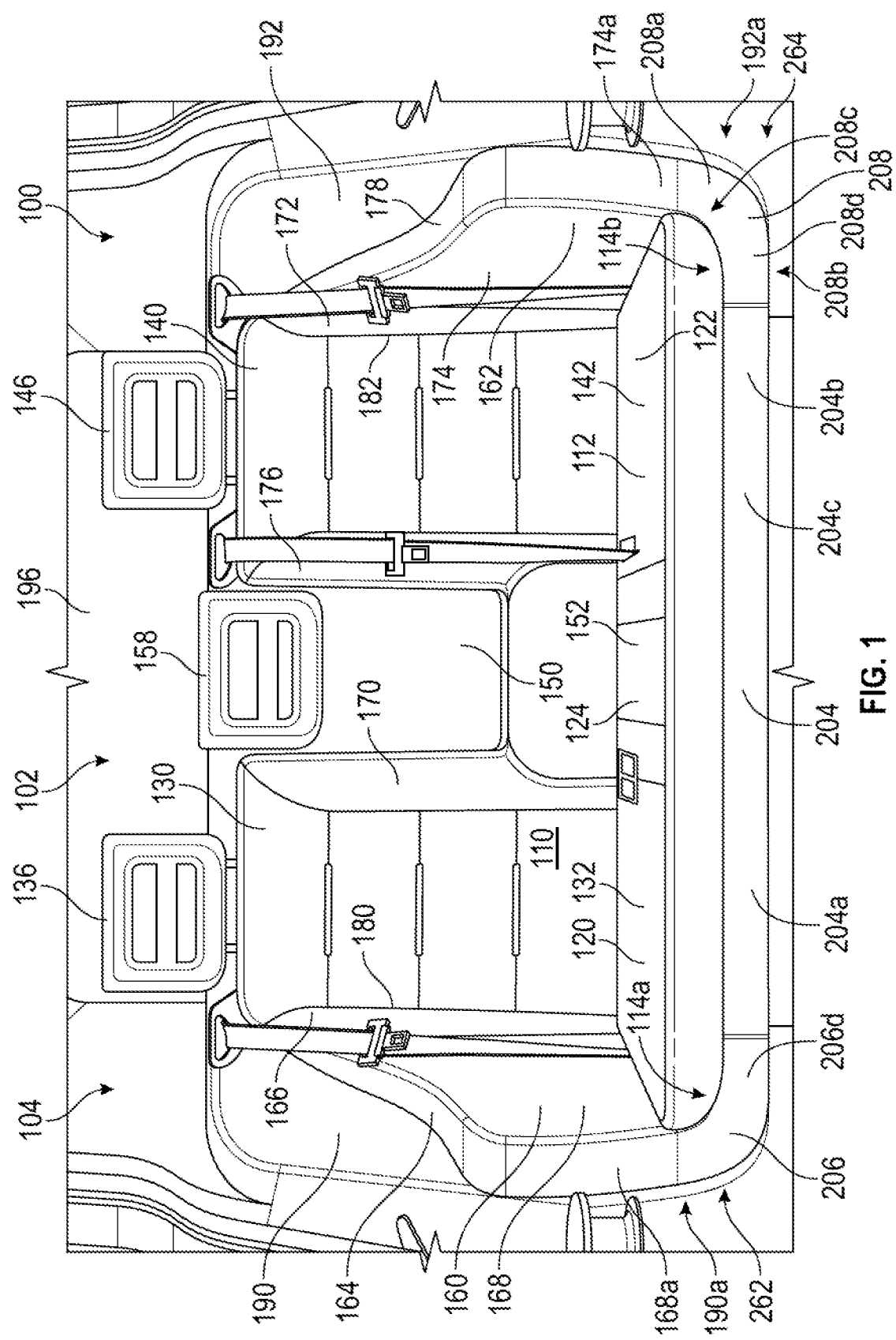
FIG. 1 is a perspective view of an exemplary vehicle seat assembly installed in a vehicle body according to the present disclosure.
Figure 2:
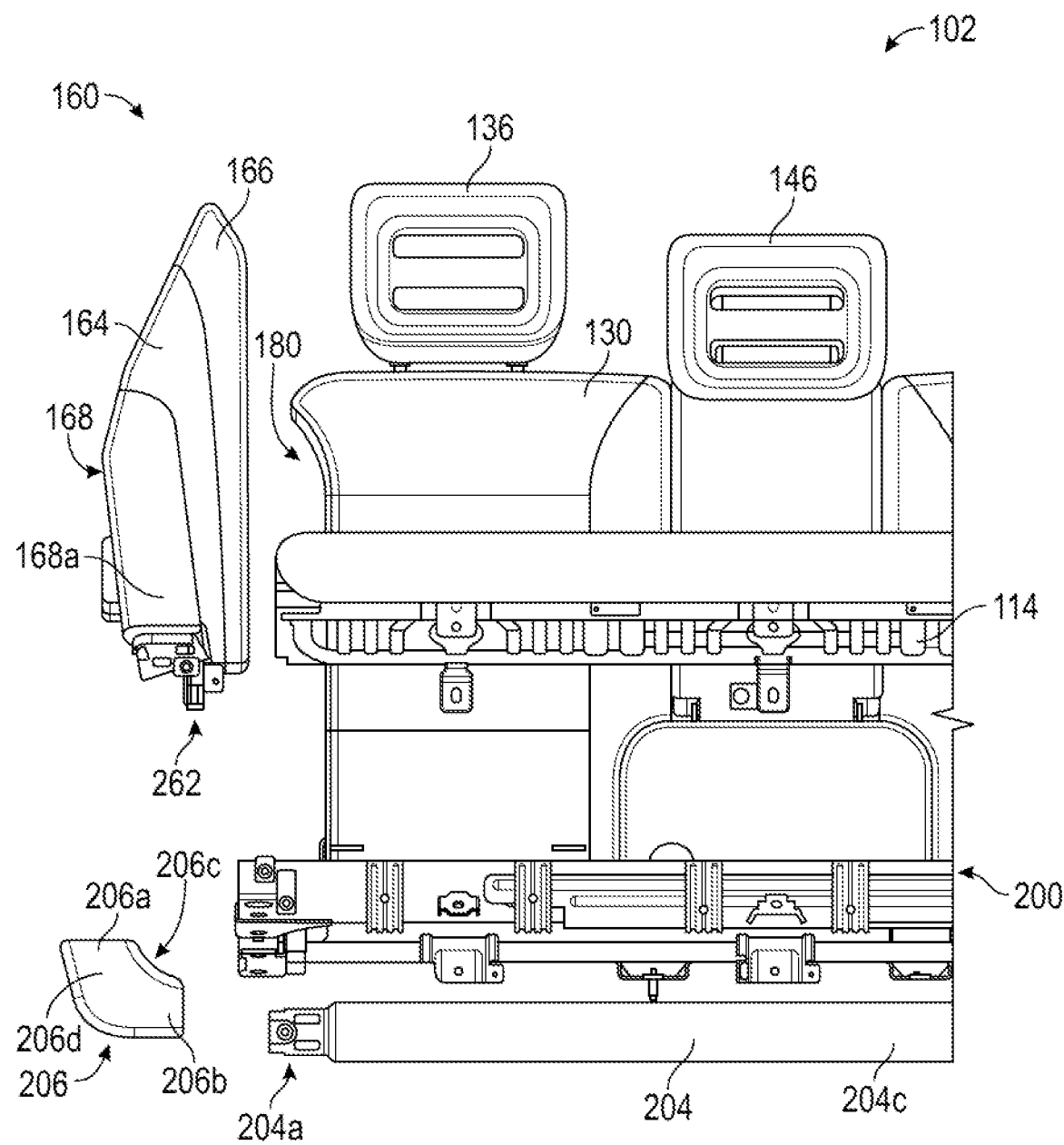
FIG. 2 is a partial exploded perspective view of FIG. 1.

Referring now to the drawings, wherein like numerals refer to like parts throughout the several views, FIG. 1 illustrates a vehicle 100 comprising a vehicle seat assembly 102 installed in a vehicle body 104 according to the present disclosure. The vehicle seat assembly 102 comprises a seat back 110 and a seat base 112. As shown in FIG. 2, the vehicle seat assembly 102 also includes a seat base frame 114.

With attention once again to FIG. 1, the seat back 110 and the seat base 112 together define a first or left outboard seating section 120, a second or right outboard seating section 122 spaced from the first outboard seating section in a width direction of the vehicle seat, and optionally a center seating section 124 positioned between the first and second outboard seating sections 120, 122 in the width direction.

The first outboard seating section 120 includes a first seat back 130 and a first seat base 132, and optionally a first headrest 136 connected to the first seat back. The second outboard seating section 122 includes a second seat back 140 and a second seat base 142, and optionally a second headrest 146 connected to the second seat back. The center seating section 124, if provided by the vehicle seat assembly 102, includes a center seat back 150 and a center seat base 152, and optionally a center headrest 158 connected to the center seat back. It should be appreciated that the center seating section 124 serves as an auxiliary seat between the first and second outboard seating sections 120, 122, and therefore can be sized in the width direction smaller than first and second outboard seating sections 120, 122.

Further, the vehicle seat assembly 102 includes a first or left side member 160 associated with the first outboard seating section 120 and a second or right side member 162 associated with the second outboard seating section 122. The first side member 160 unitarily defines a first outboard bolster 166 for the first seat back 130 and a first armrest 168. The left armrest 168 includes an outer forward facing surface 168a. Additionally, the first outboard bolster 166 is shaped and sized to substantially correspond to a first inboard bolster 170 of the first seat back 130.

The second side member 162 unitarily defines a second outboard bolster 172 for the second seat back 140 and a second armrest 174. The right armrest 174 includes an outer forward facing surface 174a. Further, the second outboard bolster 172 is shaped and sized to substantially correspond to a second inboard bolster 176 of the second seat back 142.

To accommodate the first and second outboard bolsters 166, 172, the first and second seat backs 130, 140 include respective first and second outboard recessed portions 180, 182. The first and second outboard bolsters 166, 172 of the respective first and second side member 160, 162 are positioned in and conform to the first and second outboard recessed portions 180, 182. Safety belt arrangements are provided for each of the seating sections.

As is shown in FIG. 1, the vehicle seat assembly 102 is installed in the vehicle body 104. The vehicle body 104 is part of the vehicle 100, which in the present embodiment is an autonomously-driven vehicle configured such that each side of the vehicle body 104 can define a single door opening which is closed by a sliding door (not shown). It should be appreciated that the term "vehicle body" is used generically, and should be interpreted to include structural components of the vehicle 100, such as a body frame, a roof structure, a floor structure, a door(s), exterior panels, interior panels, and the like.

The depicted vehicle body 104 includes left and right side panel members 190, 192, wherein the vehicle seat assembly 102 is fitted between the left and right side panel members with the first or left side member 160 in abutment with the left side panel member 190, and with the second or right side member 162 in abutment with the right side panel member 192. A rear panel member 196 of the vehicle body spans rearward of the vehicle seat assembly 102 in a front-rear direction of the vehicle seat.

With additional reference to FIG. 2, the vehicle seat assembly 102 further includes a seat main frame 200 to which the seat back 110 attached. Further, the seat base frame 114 is attached to the seat main frame 200. Each of the first and second side members 160, 162, and the seat base 110 is attached to the seat main frame 200. Further, each of the seat main frame 200 including the seat back 110, the first side member 160, the second side member 162, and the seat base 112 is a separate and distinct seat component of the vehicle seat assembly 102, which can be separately installed in the vehicle body 104. Each of the first and second side members 160, 162 is a unitary, one-piece seat component (i.e., the outboard bolster integral with the armrest). Each of the left and right side members 160, 162 includes a single cushion cover 164, 178 covering both the bolster 166, 172 and the armrest 168, 174.

Figure 4:
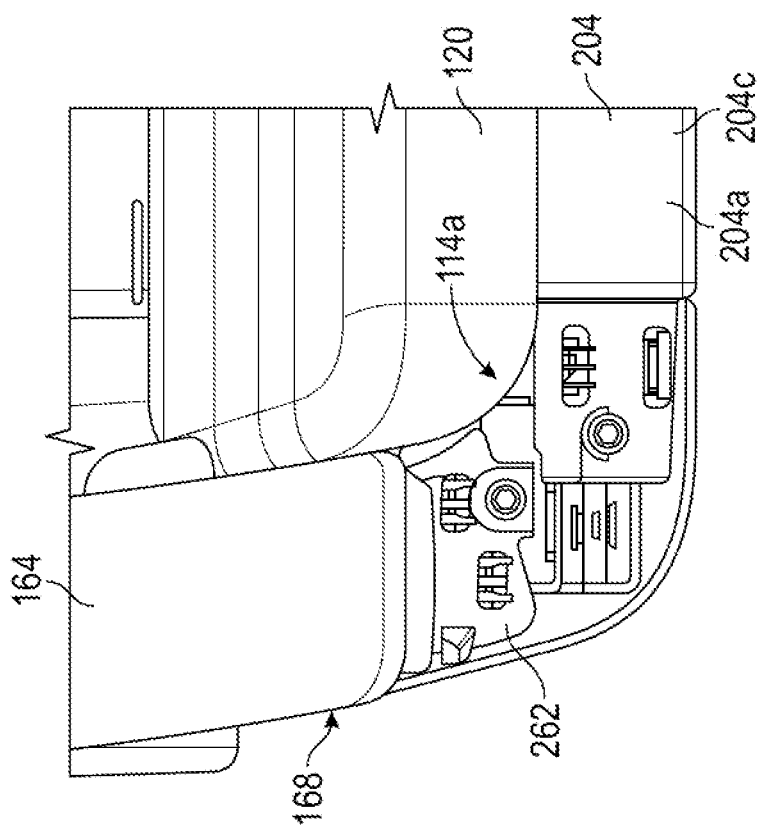
FIG. 4 is a detail perspective view of FIG. 3 with a corner cover member of the vehicle seat assembly shown in transparent to illustrate attachments of seat components of the vehicle seat assembly.
Figure 3:
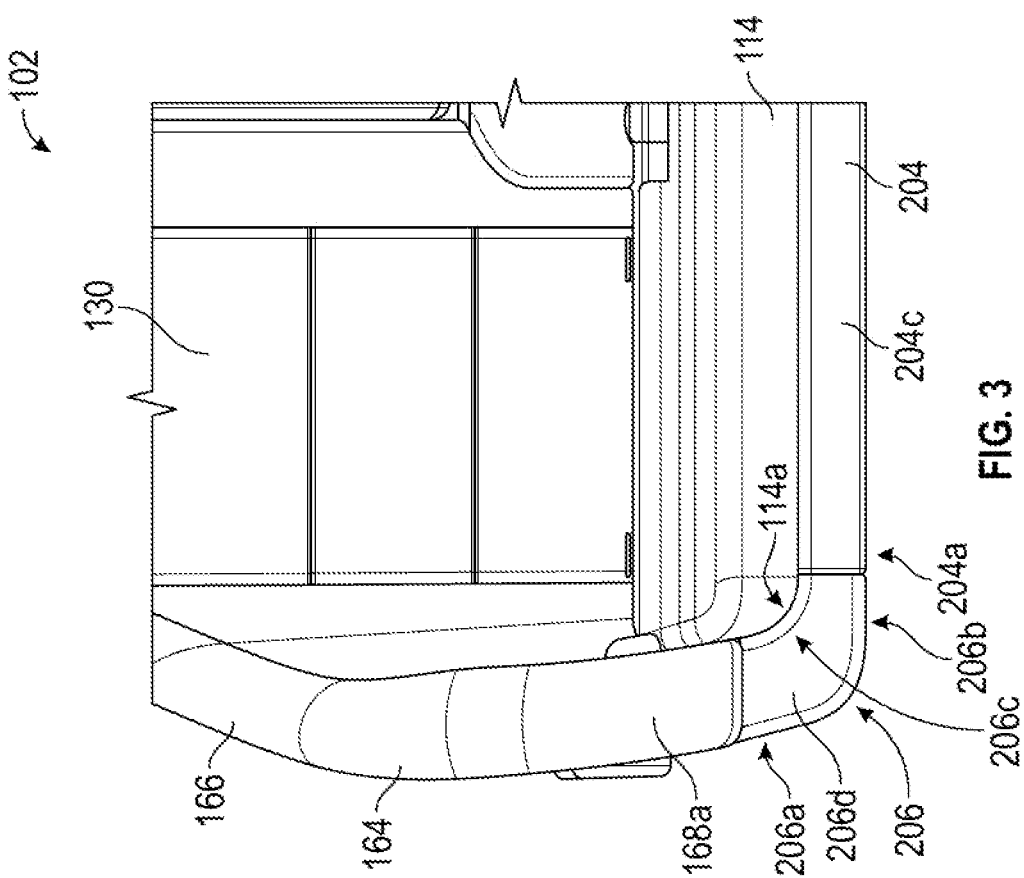
FIG. 3 is an enlarged perspective view of a side portion of the vehicle seat assembly of FIG. 1.

With reference back to FIGS. 1, 2, and 4, the first and second side members 160, 162 include a left forward attachment bracket 262 and right forward attachment bracket 264, respectively, extended downward from the respective first and second armrests 168, 174 for connection to the seat main frame 200. It should be appreciated that because the second side member 162 is constituted similar to the first side member 160, the installation of the second side member 162 to the vehicle seat assembly 102 and the vehicle body 104 is similar to the above described installation of the first side member 160. Further, although the right forward attachment bracket 264 is hidden behind a right corner cover member 208, it will be appreciated that the right forward attachment bracket 264 is identical to the left forward attachment bracket 262 and disposed in a mirror image to the left forward attachment bracket 262.

With attention back to FIGS. 1-4, the vehicle seat assembly 102 is further provided with a cushion cover member 204 positioned beneath the seat base 112 for covering the attachment of the seat base frame 114 and the seat main frame 200. Left and right end portions 204a, 204b of the cushion cover member 204 are attached to the seat main frame 200. Left and right corner cover members 206, 208 separate from the left and right side members 160, 162 and the seat base 112 are provided and adapted to cover the attachment of the respective left and right side members 160, 162 to the seat main frame 200 and cover the attachment of the cushion cover member 204 to the seat main frame 200.

The left corner cover member 206 is adapted to cover the attachment of the left forward attachment bracket 262 to the seat main frame 200. Further, the left corner cover member 206 is configured as a continuous lower extension 206a of the left armrest 168 and a continuous left lateral extension 206b of the cushion cover member 204.

The left corner cover member 206 is also adapted to cover the attachment of the left end portion 204a of the cushion cover member 204 to the seat main frame 200. The left corner cover member 206 can include a recessed portion 206c shaped to be complementarily fitted beneath a forward corner portion 114a of the seat base frame 114. The left corner cover member 206 can also include an outer surface 206d that is substantially flush with both the outer forward facing surface 168a of the left armrest 168 and the outer side surface 204c of the cushion cover member 204.

The right corner cover member 208 is adapted to cover the attachment of the right forward attachment bracket 264 to the seat main frame 200. Additionally, the right corner cover member 208 is configured as a continuous lower extension 208a of the right armrest 174 and a continuous right lateral extension 208b of the cushion cover member 204.

The right corner cover member 208 is also adapted to cover the attachment of the right end portion 204b of the cushion cover member 204 to the seat main frame 200. The right corner cover member 208 includes a recessed portion 208c shaped to be complementarily fitted beneath a forward corner portion 114b of the seat base frame 114. The right corner cover member 208 can also include an outer surface 208d that is substantially flush with both the outer forward facing surface of the right armrest 174 and the outer side surface 204c of the cushion cover member 204.

In a front view of the vehicle seat assembly 102 installed in the vehicle body 104, an outer forward facing surface 168a of the left armrest 168 of the left side member 160 and the outer surface 206d of the left corner cover member 206 is shaped to mate with an inner surface 190a of the left side panel member 190, and an outer forward facing surface 174a of the right armrest 174 of the right side member 162 and the outer surface 208d of the right corner cover member 208 is shaped to mate with an inner surface 192a of the right side panel member 192. Further, the armrest 168, 174 of each of the left and right side members 160, 162, the left and right corner cover members 206, 208 and the cushion cover member 204 are configured to together define a substantially continuous outer surface of the vehicle seat assembly 102 that spans between the left and right side panel members 190, 192 of the vehicle body 104.

It will be appreciated that the aforementioned features provide numerous benefits over the known vehicle seat assemblies. For example, installation time of the seat assembly 102 into the vehicle 100 is reduced. Further, there is a reduction in the total number of parts required for the arrangement. Further still, a smooth and continuous exterior appearance is provided that enhances the experience of the occupant of the seat and those that may view the vehicle 100 and seat assembly 102.

A method of assembling a seat within a vehicle body 104 is further provided by the present disclosure. The exemplary method includes attaching a seat main frame 200 to the vehicle body 104. The seat main frame 200 includes a seat back 110 in which left and right sides of the seat back 110 include respective left and right recessed portions 180, 182. The method also includes attaching a left side member 160 to a left side of the seat main frame 200. The left side member 160 defines a left outboard bolster 166 positioned in the left recessed portion 180 and a left armrest 168.

The method further includes attaching a right side member 162 to a right side of the seat main frame 200. The right side member 162 defines a right outboard bolster 172 positioned in the right recessed portion 182 and a right armrest 174. The method also includes attaching a seat base frame 114 to the seat main frame 200 and the seat base frame 114 includes a seat base 112. The method further includes attaching a cushion cover member 204 to the seat main frame 200 beneath the seat base 112 for covering the attachment of the seat base frame 114 and the seat main frame 200 and attaching a left corner cover member 206 to the left armrest 168 and a left end portion 204a of the cushion cover member 204. The method also includes attaching a right corner cover member 208 to the right armrest 174 and a right end portion 204b of the cushion cover member 204.

The method can further include configuring the left and right corner cover members 206, 208 to conceal the attachment of the respective left and right side members 160. 162 to the seat main frame 200 and to conceal the attachment of cushion cover member 204 to the seat main frame 200 and configuring the left corner cover member 206 as a continuous lower extension 206a of the left armrest 168 and a continuous left lateral extension 206b of the cushion cover member 204. The method can also include configuring the right corner cover member 208 as a continuous lower extension 208a of the right armrest 174 and a continuous right lateral extension 208b of the cushion cover member 204 and attaching left and right side panel members 190, 192 to the vehicle body 104.

The method can also include fitting the seat between the left and right side panel members 190, 192 with the left side member 160 and the left corner cover member 206 in abutment with the left side panel member 190, and with the right side member 162 and the right corner cover member 208 in abutment with the right side panel member 192. The method can further include configuring the left and right armrests 168, 174, the left and right corner cover members 206, 208 and the cushion cover member 204 to together define a substantially continuous outer surface of the seat that spans between the left and right side panel members 190, 192 of the vehicle body 104.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat assembly comprising:
   a seat main frame including a seat back attached to the seat main frame;
   left and right side members, each side member defining an outboard seat back bolster and an armrest and including a cushion cover, the armrest having a forward attachment bracket for attachment to the seat main frame;
   a seat base including a seat base frame attached to the seat main frame; and
   left and right corner cover members separate from the respective left and right side members and the seat base, each corner cover member is provided beneath each respective cushion cover and is adapted to cover the forward attachment bracket of the corresponding side member, the left and right corner cover members concealing the attachment of the left and right side members to the seat main frame.

2. The vehicle seat assembly of claim 1, including a cushion cover member positioned beneath the seat base for covering the attachment of the seat base frame and the seat main frame.

3. The vehicle seat assembly of claim 2, wherein each end portion of the cushion cover member is attached to the seat main frame, and each corner cover member is adapted to cover the attachment of the cushion cover member to the seat main frame.

4. The vehicle seat assembly of claim 2, wherein each corner cover member is shaped as both a lower extension of the armrest of the corresponding side member and a lateral extension of the cushion cover member.

5. The vehicle seat assembly of claim 4, wherein each corner cover member includes a recessed portion shaped to be complementarily fitted beneath a forward corner portion of the seat base.

6. The vehicle seat assembly of claim 4, wherein an outer surface of each corner cover member is substantially flush with both an outer forward facing surface of the armrest of the corresponding side member and an outer side surface of the cushion cover member.

7. The vehicle seat assembly of claim 1, wherein each of the left and right side members is a unitary, one-piece component, the bolster integral with the armrest; and each of the left and right side members includes a single cushion cover covering both the bolster and the armrest.

8. The vehicle seat assembly of claim 1, including a cushion cover member positioned beneath the seat base for covering the attachment of the seat base frame and the seat main frame, and each corner cover member is configured as an extension of the armrest of the corresponding side member for interconnecting each armrest and the cushion cover member.

9. The vehicle seat assembly of claim 1, in combination with a vehicle body, the vehicle body including left and right side panel members, wherein the vehicle seat assembly is fitted between the left and right side panel members with the left side member and the left corner cover member in abutment with the left side panel member, and with the right side member and the right corner cover member in abutment with the right side panel member.

10. The combination of claim 9, wherein an outer forward facing surface of the armrest of the left side member and an outer surface of the left corner cover member is shaped to mate with an inner surface of the left side panel member, and an outer forward facing surface of the armrest of the right side member and an outer surface of the right corner cover member is shaped to mate with an inner surface of the right side panel member.

11. The combination of claim 10, wherein the armrest of each of the left and right side members, the left and right corner cover members and the cushion cover member are configured to together define a substantially continuous outer surface of the vehicle seat assembly that spans between the left and right side panel members of the vehicle body.

12. A method of assembling a seat within a vehicle body, the method comprising:
    attaching a seat main frame to the vehicle body, the seat main frame including a seat back wherein left and right sides of the seat back including respective left and right recessed portions;
    attaching a left side member to a left side of the seat main frame, the left side member defining a left outboard bolster positioned in the left recessed portion and a left armrest;
    attaching a right side member to a right side of the seat main frame, the right side member defining a right outboard bolster positioned in the right recessed portion and a right armrest;
    attaching a seat base frame to the seat main frame, the seat base frame including a seat base;
    attaching a cushion cover member to the seat main frame beneath the seat base for covering the attachment of the seat base frame and the seat main frame;
    attaching a left corner cover member to the left armrest and a left end portion of the cushion cover member; and
    attaching a right corner cover member to the right armrest and a right end portion of the cushion cover member.

13. The method of claim 12, including configuring the left and right corner cover members to conceal the attachment of the respective left and right side members to the seat main frame and to conceal the attachment of cushion cover member to the seat main frame.

14. The method of claim 13, including configuring the left corner cover member as a continuous lower extension of the left armrest and a continuous left lateral extension of the cushion cover member, and configuring the right corner cover member as a continuous lower extension of the right armrest and a continuous right lateral extension of the cushion cover member.

15. The method of claim 12, including attaching left and right side panel members to the vehicle body, and fitting the seat between the left and right side panel members with the left side member and the left corner cover member in abutment with the left side panel member, and with the right side member and the right corner cover member in abutment with the right side panel member.

16. The method of claim 15, including configuring the left and right armrests, the left and right corner cover members and the cushion cover member to together define a substantially continuous outer surface of the seat that spans between the left and right side panel members of the vehicle body.

17. A vehicle seat assembly comprising:
    a seat main frame including a seat back attached to the seat main frame, left and right sides of the seat back include respective left and right recessed portions;
    a left side member defined by a left outboard bolster and a left armrest, the left armrest having a left forward attachment bracket for attachment to the seat main frame, the left outboard bolster positioned in the left recessed portion;
    a right side member defined by a right outboard bolster and a right armrest, the right armrest having a right forward attachment bracket for attachment to the seat main frame, the right outboard bolster positioned in the right recessed portion;
    a seat base including a seat base frame attached to the seat main frame;
    a cushion cover member positioned beneath the seat base for covering the attachment of the seat base frame and the seat main frame;
    a left corner cover member separate from the left side member and adapted to cover the attachment of the left forward attachment bracket to the seat main frame; and
    a right corner cover member separate from the right side member and adapted to cover the attachment of the right forward attachment bracket to the seat main frame.

18. The vehicle seat assembly of claim 17, wherein left and right end portions of the cushion cover member is attached to the seat main frame, the left corner cover member is adapted to cover the attachment of the left end portion of the cushion cover member to the seat main frame, and the right corner cover member is adapted to cover the attachment of the right end portion of the cushion cover member to the seat main frame.

19. The vehicle seat assembly of claim 17, wherein the left corner cover member is configured as a continuous lower extension of the left armrest and a continuous left lateral extension of the cushion cover member, and the right corner cover member is configured as a continuous lower extension of the right armrest and a continuous right lateral extension of the cushion cover member.

20. The vehicle seat assembly of claim 17, wherein an outer surface of the left corner cover member is substantially flush with both an outer forward facing surface of the left armrest and an outer side surface of the cushion cover member, and an outer surface of the right corner cover member is substantially flush with both an outer forward facing surface of the right armrest and the outer side surface of the cushion cover member.

\* \* \* \* \*